United States Patent
Nelson

(10) Patent No.: US 12,194,388 B2
(45) Date of Patent: Jan. 14, 2025

(54) METHOD AND APPARATUS FOR PROVIDING A COMPUTER IMPLEMENTED GAME

(71) Applicant: KING.COM LIMITED, St. Julians (MT)

(72) Inventor: Oliver Nelson, Barcelona (ES)

(73) Assignee: KING.COM LTD., St. Julians (MT)

( * ) Notice: Subject to any disclaimer, the term of this patent is extended or adjusted under 35 U.S.C. 154(b) by 78 days.

(21) Appl. No.: 17/810,084

(22) Filed: Jun. 30, 2022

(65) Prior Publication Data
US 2024/0001243 A1    Jan. 4, 2024

(51) Int. Cl.
A63F 13/00 (2014.01)
A63F 13/45 (2014.01)
A63F 13/69 (2014.01)
A63F 13/79 (2014.01)

(52) U.S. Cl.
CPC .............. *A63F 13/69* (2014.09); *A63F 13/45* (2014.09); *A63F 13/79* (2014.09)

(58) Field of Classification Search
CPC .......... A63F 13/67; A63F 13/57; A63F 13/56; A63F 13/79
See application file for complete search history.

(56) References Cited

U.S. PATENT DOCUMENTS

| | | | | |
|---|---|---|---|---|
| 2006/0246972 | A1* | 11/2006 | Thomas | A63F 13/00 463/4 |
| 2006/0246973 | A1* | 11/2006 | Thomas | A63F 13/79 463/4 |
| 2010/0281432 | A1* | 11/2010 | Geisner | G06F 3/011 715/849 |

* cited by examiner

*Primary Examiner* — David L Lewis
*Assistant Examiner* — Eric M Thomas
(74) *Attorney, Agent, or Firm* — Saul Ewing LLP

(57) ABSTRACT

A computer implemented server is configured to provide a computer implemented game. The server receivers, from a user device, data defining a user input and a simulation for a game entity determined by the user device with that user input. That user input is used by the server to generate a server simulation. The server simulation is compared to the user device simulation. If the difference between the simulations is within a threshold, the server simulation is updated by a bias. The bias depends on the difference between the simulations.

22 Claims, 15 Drawing Sheets

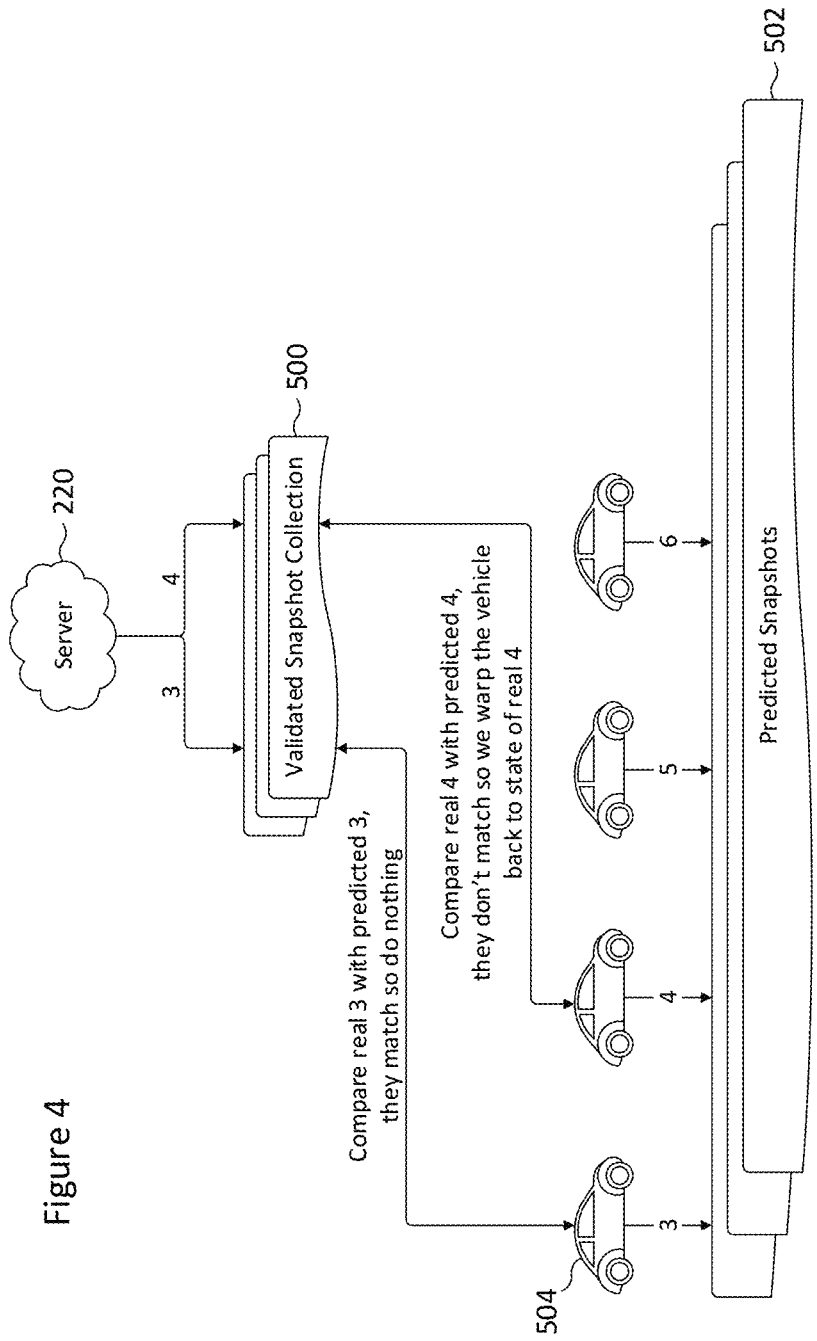

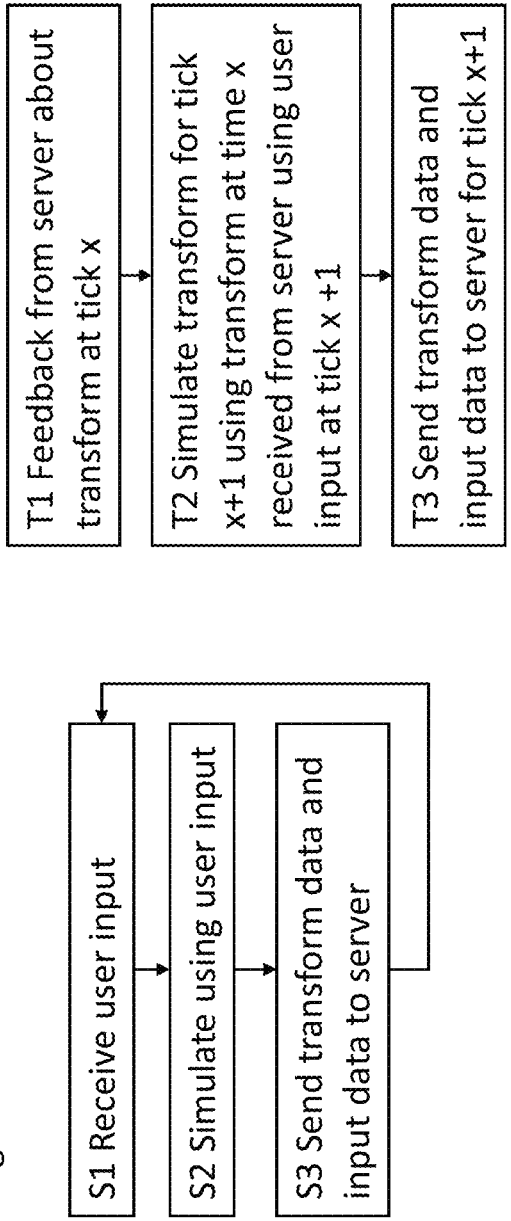

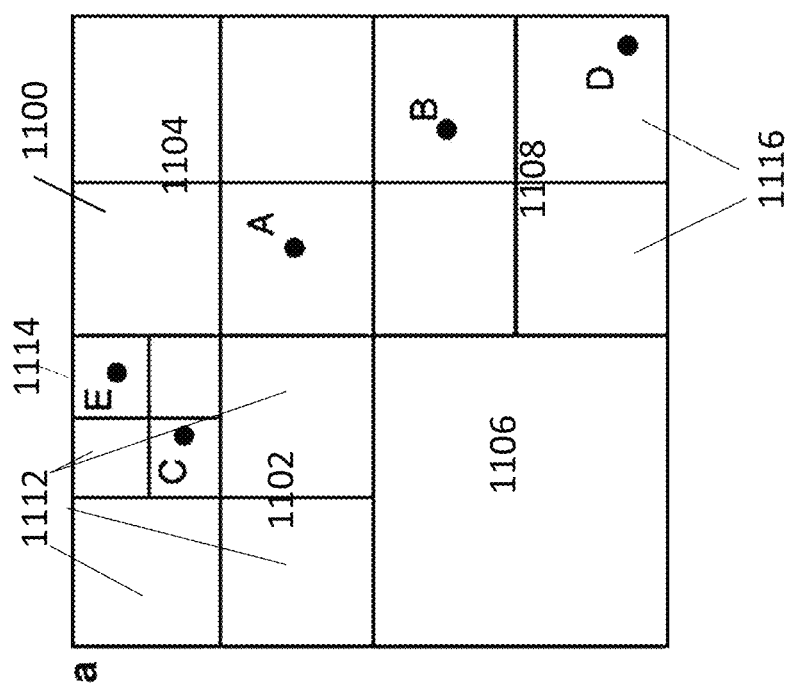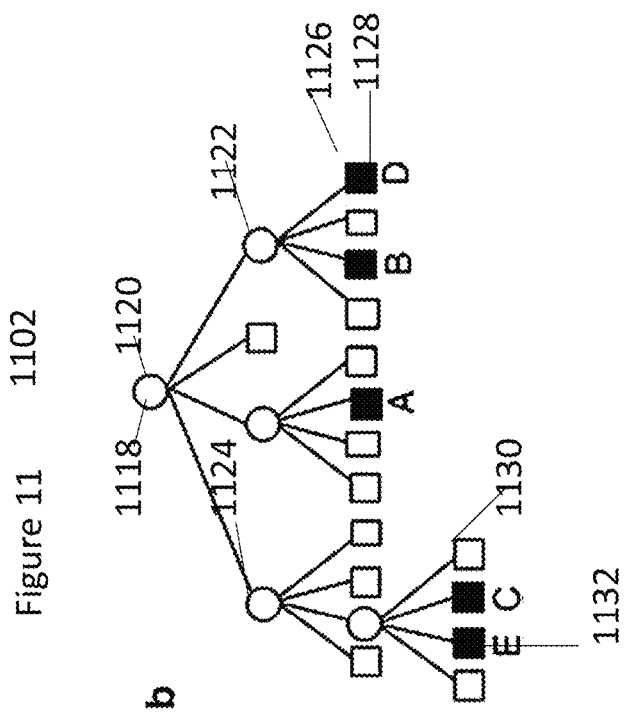
Figure 11

METHOD AND APPARATUS FOR PROVIDING A COMPUTER IMPLEMENTED GAME

FIELD OF THE INVENTION

Some embodiments may have particular, but not exclusive application, in the field of computer implemented games, and computing devices and servers therefor.

Some embodiments may relate to a user device and a server for use in running a computer implemented game. The computer implemented game may be a multiplayer computer implemented game.

Some embodiments may relate to synchronising of a multiplayer computer implemented game between the user devices and the server.

BACKGROUND OF THE INVENTION

In the field of computer-implemented games, there are many technical challenges in managing the state of a computer implemented game which is played on a number of different user devices.

Playing multiplayer computer implemented games on mobile devices has several technical challenges.

One technical challenge relates to latency. Typically in multi-player games, each mobile device provides information to a server about game play on the respective mobile device. The server will then provide information about the game play on one mobile device to the one or more other mobile devices on which the game is being played. Connectivity limitations between the mobile devices and the server can lead to latency or lag. In a worst case scenario, this could result in the game entities being in the wrong place when interacting.

Another technical challenge relates to limitations on availability of processing capability on the mobile device.

SUMMARY OF THE INVENTION

According to an aspect there is provided a computer implemented server configured to provide a computer implemented game, the computer implemented server comprising at least one processor which is configured to: receive from a user device data defining a user input at a first given time and data about a first simulation for a first game entity, the first simulation determined on the user device using the user input at the first given time; use the received data defining the user input at the first given time to determine a second simulation for the first game entity, the second simulation determined using data stored in the server; responsive to a difference in the first and second simulations, determine a bias; and update the second simulation using the determined bias for providing an updated simulation for the first given time.

The at least one processor may be configured to: to determine that there is less than a threshold difference between the first and second simulations, and when there is less that a threshold difference, determining the bias.

The at least one processor may be configured to determine that there is less than the threshold difference between the first and second simulations by determining that the first simulation lies within a threshold area of the second simulation.

The threshold area may comprise a circle.

The bias may comprise a blend of information relating to the first simulation and the second simulation.

The at least one processor may be configured to: to use data relating to the updated simulation when determining a third simulation for a next time interval using data received from the user device defining a user input of the next time interval.

The at least one processor may be configured to: receive from the user device data defining a user input at a second given time and data about a fourth simulation for the first game entity, the fourth simulation determined on the user device using the user input at the second given time; use the received data defining the user input at the second given time to determine a fifth simulation for the first game entity, using data stored in the server; responsive to a difference in the fourth and fifth simulations being larger than a threshold difference, cause information associated with fifth simulation to be sent to the user device for providing an updated simulation for the second given time.

The at least one processor may be configured to: receive from the user device data defining a user input at a third given time and data about a sixth simulation for the first game entity, the sixth simulation determined on the user device using the user input at the third given time; use the received data defining the user input at the third given time to determine a seventh simulation for the first game entity, using data stored in the server; and responsive to there being no difference in the sixth and seventh simulations determining that the sixth simulation is correct.

The computer implemented game may be a multiplayer computer implemented game where one instance of the computer implemented game is played by a plurality of different players on respective user devices.

The user device may be is a mobile device.

According to another aspect, there is provided a system comprising a computer implemented server and a user device configured to provide a computer implemented game, the user device comprising at least one processor which is configured to: transmit to the server data defining a user input at the first given time and data about a first simulation for a first game entity, the first simulation determined using the user input at the first given time, and the computer implemented server comprising at least one processor which is configured to: receive from the user device the data defining the user input at a first given time and data about the first simulation for a first game entity; use the received data defining the user input at the first given time to determine a second simulation for the first game entity, the second simulation determined using data stored in the server; responsive to a difference in the first and second simulations, determining a bias; and updating the second simulation using the determined bias for providing an updated simulation for the first given time, According to another aspect, there is provided a computer implemented method performed by a server configured to provide a computer implemented game, the method comprising: receiving from a user device data defining a user input at a first given time and data about a first simulation for a first game entity, the first simulation determined on the user device using the user input at the first given time; using the received data defining the user input at the first given time to determine a second simulation for the first game entity, the second simulation determined using data stored in the server; responsive to a difference in the first and second simulations, determining a bias; and updating the second simulation using the determined bias for providing an updated simulation for the first given time.

The method may comprise determining that there is less than a threshold difference between the first and second simulations, and when there is less that a threshold difference, determining the bias.

The method may comprise determining that there is less than the threshold difference between the first and second simulations by determining that the first simulation lies within a threshold area of the second simulation.

The threshold area may comprise a circle.

The bias may comprise a blend of information relating to the first simulation and the second simulation.

The method may comprise using data relating to the updated simulation when determining a third simulation for a next time interval using data received from the user device defining a user input of the next time interval.

The method may comprise: receiving from the user device data defining a user input at a second given time and data about a fourth simulation for the first game entity, the fourth simulation determined on the user device using the user input at the second given time; using the received data defining the user input at the second given time to determine a fifth simulation for the first game entity, using data stored in the server; and responsive to a difference in the fourth and fifth simulations being larger than a threshold difference, causing information associated with fifth simulation to be sent to the user device for providing an updated simulation for the second given time.

The method may comprise receiving from the user device data defining a user input at a third given time and data about a sixth simulation for the first game entity, the sixth simulation determined on the user device using the user input at the third given time; using the received data defining the user input at the third given time to determine a seventh simulation for the first game entity, using data stored in the server; responsive to there being no difference in the sixth and seventh simulations determining that the sixth simulation is correct.

The computer implemented game may be is a multiplayer computer implemented game where one instance of the computer implemented game is played by a plurality of different players on respective user devices.

The user device may be a mobile device.

According to an aspect, there is provided a computer readable non-transitory storage medium carrying one or more computer executable instructions which when run on at least one processor cause: receiving from a user device data defining a user input at a first given time and data about a first simulation for a first game entity, the first simulation determined on the user device using the user input at the first given time; using the received data defining the user input at the first given time to determine a second simulation for the first game entity, the second simulation determined using data stored in the server; responsive to a difference in the first and second simulations, determining a bias; and updating the second simulation using the determined bias for providing an updated simulation for the first given time.

According to an aspect, the user device is configured to provide a computer implemented game, the user device comprising: a memory configured to store a plurality of sets of snapshot data for the computer implemented game, each set of snapshot data being associated with a respective time; a receiver configured to receive from a server information identifying a plurality of said sets of snapshot data and delta data; an extrapolator configured to determine a predicted set of snapshot data using the identified sets of snapshot data; and at least one processor configured to apply the delta data to the predicted set of snapshot data to provide a next set of snapshot data.

The at least one processor may be configured to determine for which one or more game entities of the computer implemented game data is to be included in a respective set of snapshot data.

The at least one processor may be configured to determine for which one or more game entities of the computer implemented game data is to be included in a respective set of snapshot data based on a priority of a respective game entity.

The at least one processor may be configured to determine for which one or more game entities of the computer implemented game data is to be included in a respective set of snapshot data based on one or more of a relevance associated with a respective game entity and an urgency associated with a respective game entity.

According to an aspect, the computer implemented server is configured to provide a computer implemented game, the computer implemented server comprising: a memory configured to store a plurality of sets of snapshot data for the computer implemented game, each set of snapshot data being associated with a respective time; an extrapolator configured to determine a predicted set of snapshot data using a plurality of sets of snapshot data; at least one processor configured to determine delta data using the predicted set of snapshot data and a next set of snapshot data; and a transmitter configured to send information about which of the plurality of sets of snapshot data are used to determine the predicted set of snapshot data and the delta data to a user device.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIG. 4 schematically shows local vehicle prediction;

FIG. 6 shows a first method performed at a user device of some embodiments;

FIG. 7 shows a second method performed at a user device of some embodiments;

FIG. 11 schematically shows the representation of an image displayed on the display and associated quadtree structure;

DETAILED DESCRIPTION OF SOME EMBODIMENTS

The terms user and player are used interchangeably throughout this document and no specific meaning is intended using one or the other unless the context suggests otherwise. Likewise user device and client device are used interchangeably throughout this document and no specific meaning is intended using one or the other unless the context suggests otherwise.

In the following description of various implementations of embodiments, reference is made to the accompanying drawings which form a part thereof, and in which are shown by way of illustration various implementations in which the invention may be utilized. It is to be understood that other implementations may be utilized, and structural and functional modifications may be made without departing from the scope of the present invention.

A person skilled in the art will realise that what is described herein are certain example embodiments. It is possible to implement embodiments in a number of variations.

Figure 1:
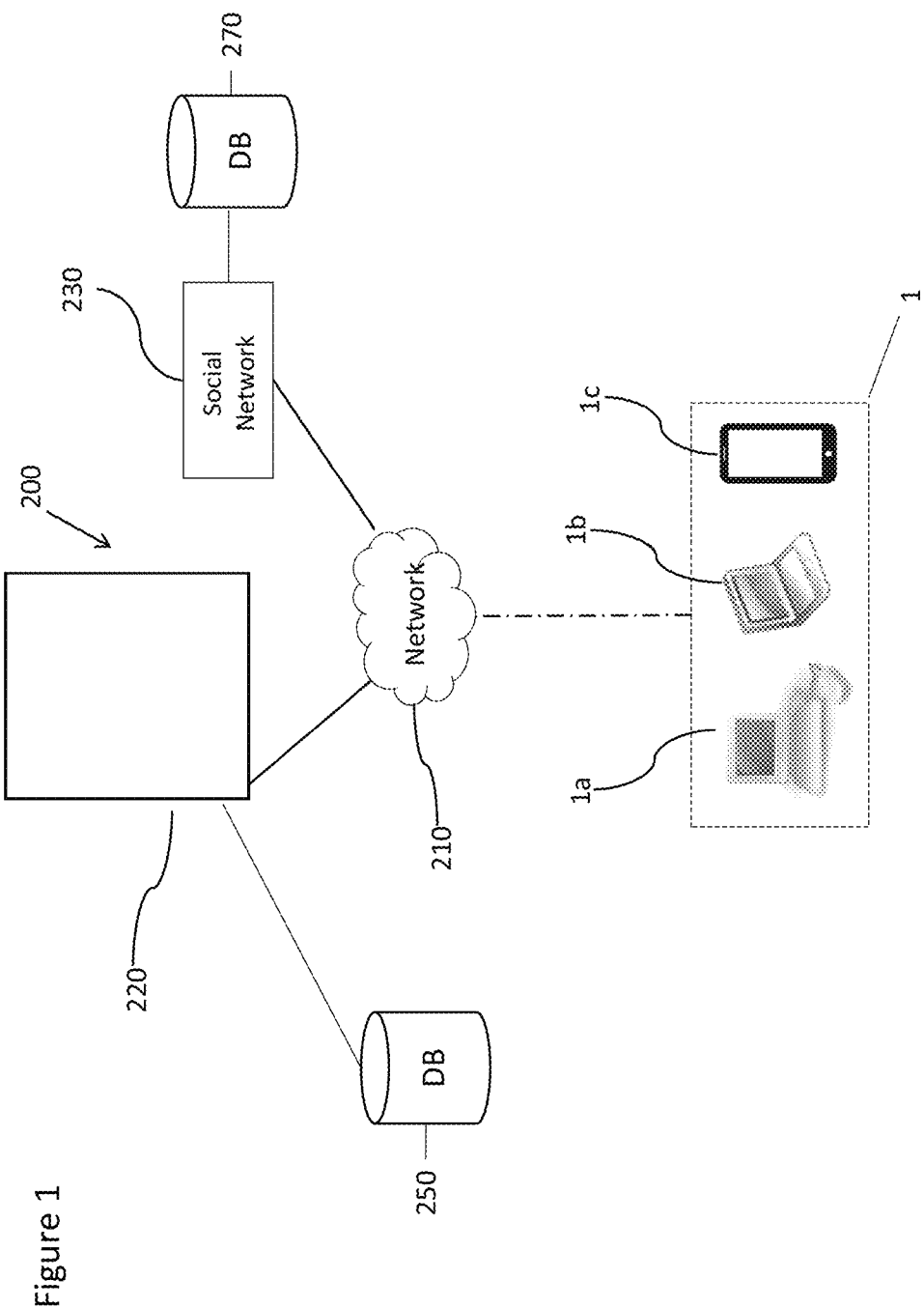
FIG. 1 shows an example system in which some embodiments may be provided.

FIG. 1 schematically shows a system 200 according to an embodiment. The system 200 comprises a server 220 which may store or be in communication with database 250 which may, in some embodiments, store game player's details, profiles, statistics etc. In practice, one or more databases 250 may be provided. In practice, one or more servers 220 may be provided. Where one or more server is provided, the database(s) 250 may be provided in one database 250 across two or more servers.

The server 220 may communicate via, for instance, the internet 210 with client or user devices 1, shown in FIG. 1 by way of example as user devices 1a, 1b and 1c. The server 220 may have connections to a social network 230, for example, Facebook™. The connections may be via the network or via a direct connection. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of part of the database 270 being made on the user device 1.

It should be recognised by those skilled in the art that the databases herein referred to may comprise external or remote storage, such as that described as being in a "cloud".

Figure 2:
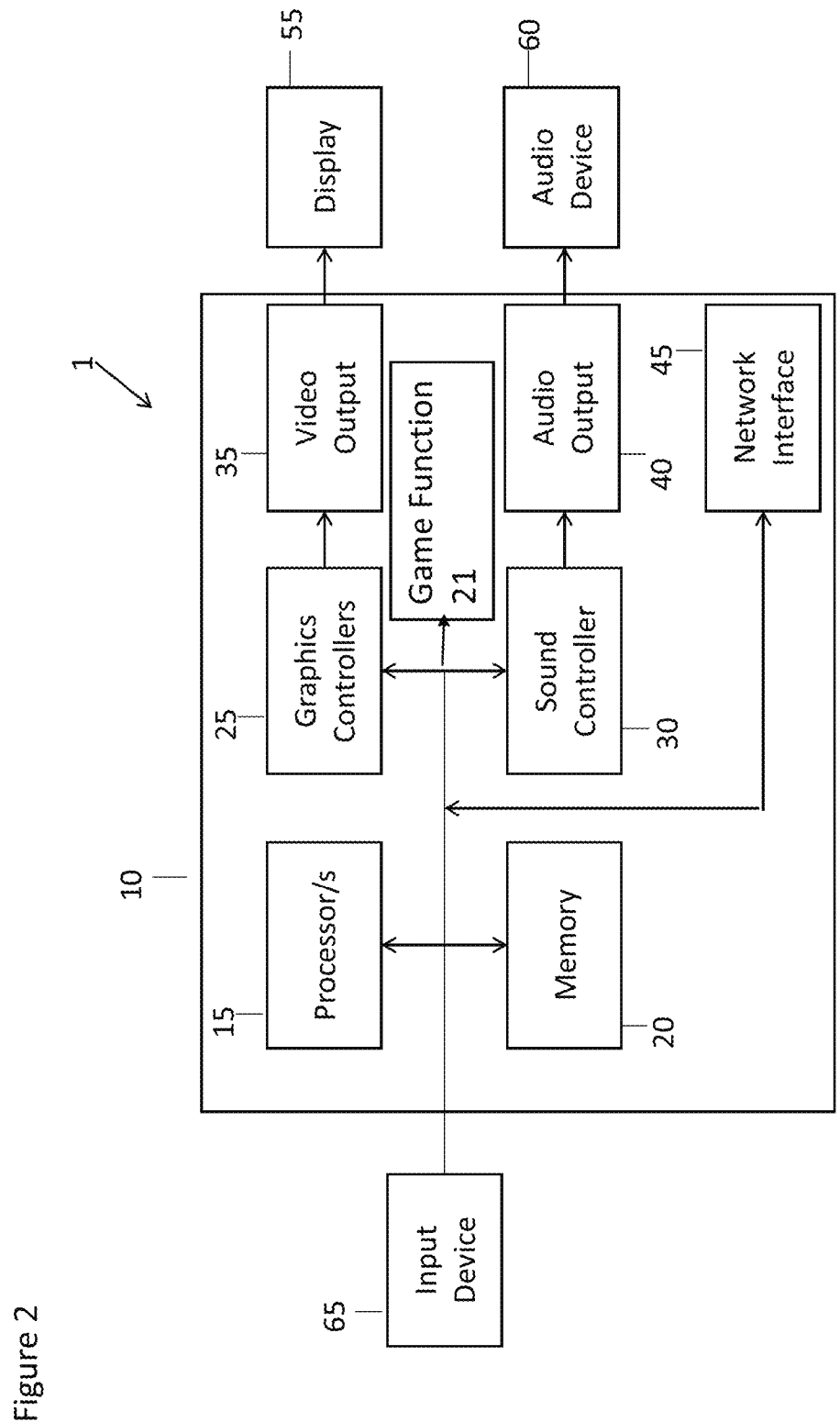
FIG. 2 shows an example user device in which some embodiments may be provided.

A schematic view of a user or client device 1 which may be configured to provide one or more embodiments is shown in FIG. 2. The user device is a computer implemented device. The user device may be configured to provide a computer implemented game. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may comprise one or more processors and/or be provided by the one or more processors 15. The graphics and sound controllers may comprise memory and/ or may operate in conjunction with the one or more memories 20.

The graphics controller 25 is configured to provide a video output 35. The sound controller 30 is configured to provide an audio output 40. The video output 35 is provided to a display 55. The audio output 40 is provided to an audio device 60 such as a speaker and or earphone(s).

The control part 10 has an interface 45 allowing the device to be able to communicate with a network such as the Internet or other communication infrastructure.

The device 1 has an input device or user interface 65. The input device can take any suitable format and can be one or more of a keyboard, mouse, touch screen, joystick, or game controller. It should be appreciated that the display 55 may in some embodiments also provide the input device 65 by way of an integrated touch screen for example.

The user device comprises a game function 21 provides a computer implemented game. It should be appreciated that game function 21 may comprise one or more processor and/or be provided by the one or more processors 15. The game function may comprise memory and/or may operate in conjunction with the one or more memories 20. The game function 21 may interact with one or more other parts of the user device.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

The user device may be a so-called smart phone or tablet. In some embodiments, the user device may be relatively small. The user device may be provided with a relatively small touch screen or display. In some embodiments, the user device may be a laptop or desktop computer.

Some embodiments provide a user device which is configured to provide a computer implemented game. The computer game may any suitable type.

Some embodiments may be provided in the context of a multi-player game. Players may control one or more computer game entities which interact with one or more computer game entities of other players. Thus different players will play the same instance of the game on their own device. Each player will only be able to control their own entities. Information about the entities is provided by the player's device to a server. The server will provide that information to the other players which are playing the same instance of the multiplayer game.

In one example, the game entities are cars. The entities may be attack one another by crashing into one another and/or by using weapons or objects which can be aimed at the game entities of other players. However, it should be appreciated that the entities can be visualised in any other suitable form.

Some embodiments may be played on mobile devices. Playing multiplayer games on mobile devices has several technical challenges as previously discussed.

Figure 3:
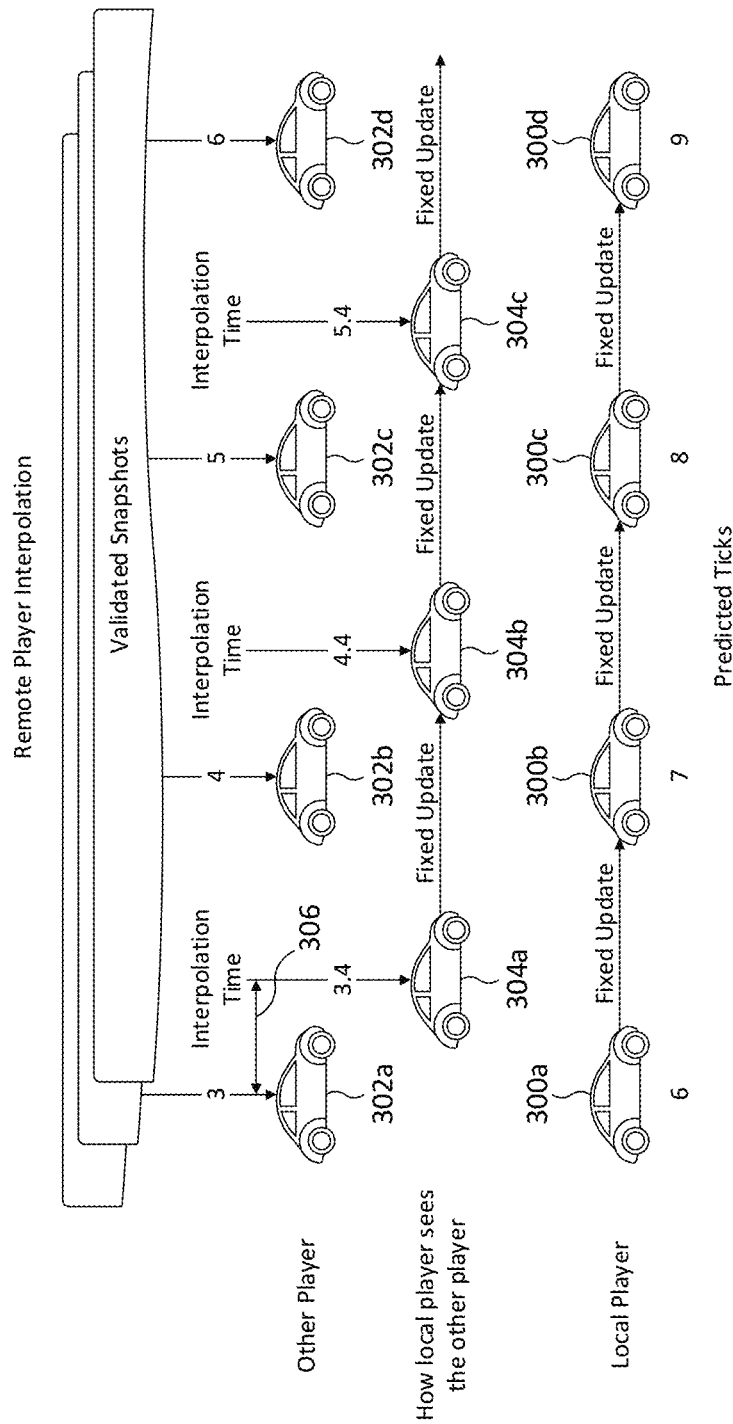
FIG. 3 schematically shows remote player interpolation.

Reference is made to FIG. 3. In some embodiments, the game function or client of the user device is configured to simulate the game entities over which the user device has direct influence into the future. When a player wants to interact (by providing an input via the user interface) with the game simulation, the game function creates a small data structure containing the input provided by the player and gives it to the simulation. In a multiplayer session, these inputs (in the form of the data structure or any other suitable data structure) are sent by the client every update to the server.

The game entity in the user device is referenced 300. The game entity referenced 300a may be the entity at a current time (for example tick 6). The game entity referenced 300b may be the predicted simulation of the entity at tick 7. Likewise, the game entity referenced 300c may be the predicted simulation of the game entity at tick 8 and the game entity referenced 300d may be the predicted simulation of the game entity at tick 9. The future is the ticks the client is predicting ahead of the server. The number of ticks ahead may depend on one more network factors such as latency, latency variation, packet loss and/or the like.

In this application, tick is used as a time count. The number of ticks represents a measure of time since a start time. A tick will be provided at regular time intervals. The length of time between ticks is controlled by the server and can be any suitable value. The length of time between ticks may be fixed. In some example embodiments, the length of time between ticks may be 40 ms. This value is by way of example only and in different embodiments, the length of time between ticks may be more than 40 ms or less than 40 ms. In other embodiments, the value of a tick may change. This may for example be due to changes in network conditions.

In the context of the example computer implemented game described previously, the game entities over which the client has control may be the player's vehicle or a bomb or other item that has just been thrown by a game entity of the player and/or any other suitable game entity.

The game entities that the client device does not have influence over are interpolated between snapshot data received from the server. These game entities may be those of the other players of the computer implemented game. This means the states of the remote entities the client sees are always correct, but always old (how old is based on network latency). Snapshot data represents a set of data associated with a timestamp or with a given time range. A snapshot may be a collection of compressed component data for the different entities synchronized across the network. To generate the snapshot data, all the fields from all the game components are taken and used to build a snapshot that holds all the fields. This may be as integers in some embodiments.

The snapshot data of the entity of another player for ticks 3 to 6 is schematically represented by the snapshots 302a to d respectively. The snapshot data of the entity of another player as seen by the local player for ticks 3 to 6 is schematically represented by the snapshots 304a to c respectively.

The client device may make adjustments to the time scale, this does not change the delta time between the server timeline and the client timeline. (In the example of FIG. 3, the delta time is 0.4 ticks.) The adjustment may change the frequency at which updates are executed. This change in frequency allows the client to throttle up or down, bringing it further or closer in time with the server.

Changing the time scale dynamically introduces an issue which is addressed by some embodiments: the server always has a time scale of 1, meaning that if the client is executing too quickly, the client would eventually starve its access to snapshots to interpolate between because the server is not providing them quick enough. To deal with this, in some embodiments, the client may estimate the server's clock through constant round trip acknowledgements, and then apply a negative time offset to this clock. This time is referred to in this document as "interpolation time" 306 or "remote view time". This is a time where it is likely that there is snapshot data with timestamps that surround that time. The negative offset acts as a buffer to buy some extra time for snapshots to come in before they are needed for interpolation. This may trade off delay for smoother remote entity motion.

This results in two time frames: the local client prediction time (the time frame the player's vehicle is in) and the interpolation time (the time frame of the other players). In the example shown in FIG. 3, there is around 3 ticks difference between the local client prediction time and the interpolation time.

In order for the player's vehicle to be able to physically collide with a remote vehicle (that is a vehicle controlled by a different player), their states need to be brought into the same physics world even though they reside in different time frames.

As can be thus seen from FIG. 3, the current interpolated state between two snapshots is taken and then included in the same fixed update as the local vehicle.

No matter how fast the client is executing fixed updates, the interpolation time will always be increasing at the same rate in real time, allowing for interactions between the vehicle of a local player with the vehicle of a remote player. However interactions in different time frames introduces issues that are addressed by some embodiments.

Due to network latency, if the client were to simply rely on setting the current player's vehicle to the latest state received from the server, this may create a lag in the controls. In other words, in this scenario the player would provide an input via the input device and there would be a delay or a lag in the player's game entity responding to that input. In some embodiments, to avoid or mitigate this lag, the client device is configured to predict the state of the current vehicle ahead of time by running the simulation for the vehicle locally. In this regard reference is made to FIG. 4. For each entity 504, the client device predicts for a given number of ticks and then stores the predicted state into a circular buffer of predicted snapshots called the "predicted snapshot collection" 502 and when snapshots are received from the server 220, these are stored in a similar "validated snapshot collection" 500.

Whenever the client receives a snapshot from the server for the current player's vehicle the client device should accept it as the truth and apply it to the current player's vehicle. However these snapshots are always old due to network latency. The reason the client device has a predicted snapshot collection 502 is so the client device can compare what the client device previously predicted on a certain tick to a newly received validated snapshot for the same tick.

For example; the client device might be currently predicting the current player's vehicle at tick 5 but then the client device receives a snapshot from the server for tick 3. The client device has already predicted tick 3 so the client device has a predicted snapshot available. The client device compares the two snapshots for tick 3 and if they match up the client device knows that the client device predicted correctly and nothing needs to be done.

On the next tick 6 the client device receives another snapshot from the server for tick 4. When the client device compares the snapshots for tick 4, the client device sees there is a miss-match which means the client device predicted tick 4 incorrectly. This will invalidate the predicted states the client device has for ticks 5 and 6.

One option would be to revert the current player's vehicle state back to tick 4 using the new validated snapshot and then within the same frame process tick 5 and 6 again bringing the player back to the current player's original time frame. Depending on the player's network latency, this process could end up putting an undue load on the CPU or processor of the user device. This is particularly undesirable where the game is being played on a device such a mobile phone or the like. This could lead to user device processor throttling and/or severe limitations as to what the client device could do game design wise.

In some embodiments, the client device simply bring the vehicle's state back to tick 4 and continues from there. Some embodiments may address a possible temporal issue where the client device is now predicting tick 6 with state that was meant for tick 4. Thus in embodiments, the rollback and re-simulation method is avoided. Some embodiments may provide a CPU or processor performance boost for example when the game is played on a mobile phone or similar device.

In embodiments, the client device does not need to simulate multiple ticks per frame. This may allow for multiplayer gaming requiring not much more CPU processing than single player gaming.

In embodiments, whenever the client device simulates the local vehicle on the client device, the client device first applies the current player's player input and then runs a simulation. The client device will then take the resulting vehicle transform for that tick and add it alongside the input. Data defining both the original input and the transform are then sent to the server.

When the server receives the client input data, it will apply this input to the vehicle locally and simulate the vehicle itself. The result of this simulation will define the authoritative state of the vehicle for that tick. The server now has an additional transform "hint" of what the client predicted the state of the vehicle to be before the server has simulated the state itself. Thus the server is aware of differences between the results of the simulation which the client device has run and the simulation which the server itself has run. The server can then make use of this information to determine what if any remedial action is required. Some examples of this are described with reference to FIGS. 5a to 5c.

Figure 5A:
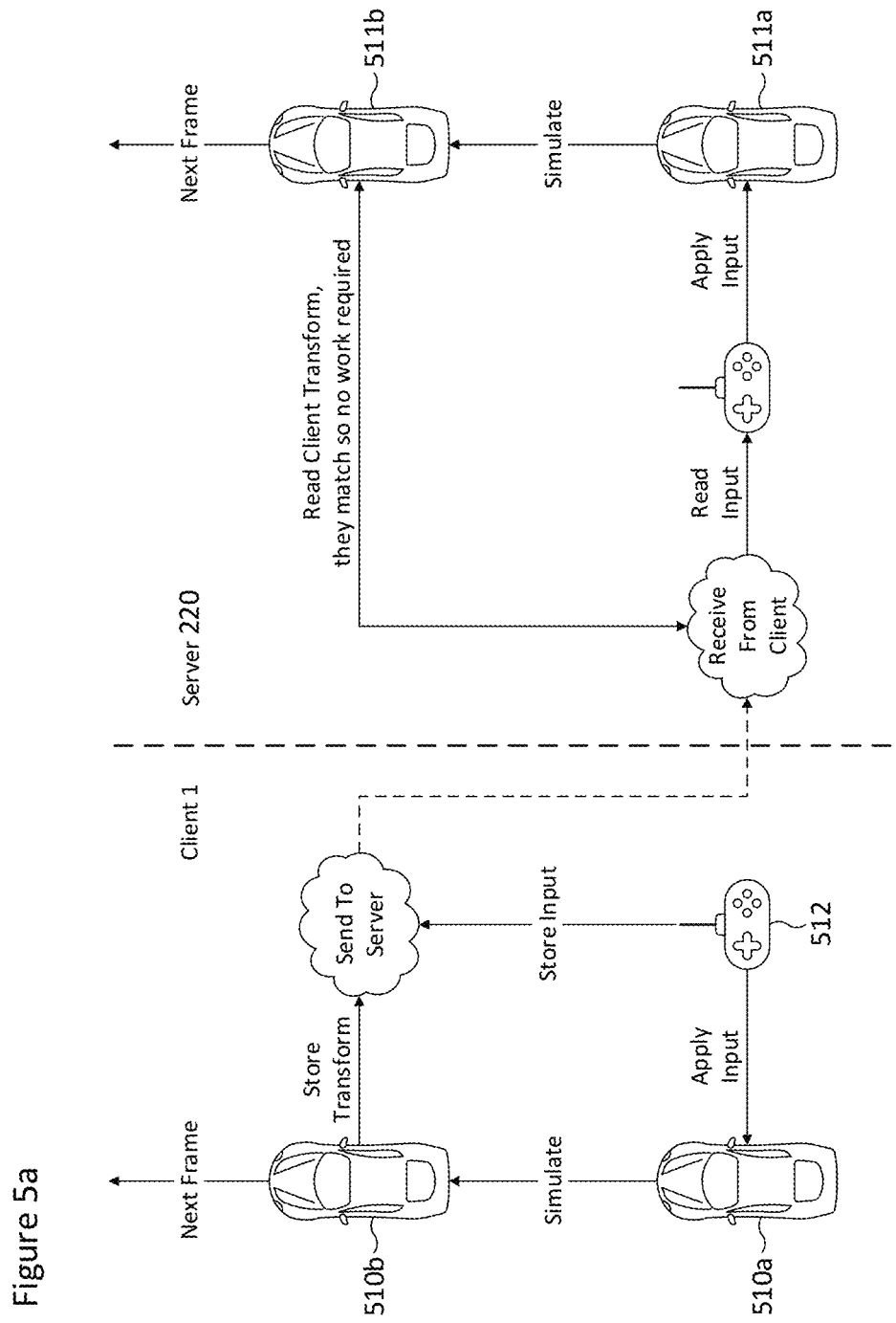
FIG. 5a schematically shows a scenario where the client and server simulation match.

Reference is first made to FIG. 5a. The player's entity is referenced 510a. The user provides a control input via a controller 512 (or other suitable user interface). This input is applied to the player's entity. The client device first applies the current player's input from the controller to the player's entity 510a and then runs a simulation to provide the simulated entity 510b. This is stored as a transform and sent to the server 220 along with the control input which is received via the controller.

The server receives from the client the transform and the control input. The control input is applied to the players entity 511a which it has stored locally and then runs a simulation to provide the simulated entity 511b. This is compared with the client transform received from the client and if they match (as they do in the Figure then no adjustments need to be considered. In other words, the snapshot which the client received back from the server for that tick will match the predicted snapshot which the client determined for that tick. As they match, the client device is able to determine that the predication which that client device made was correct and nothing further needs to be done.

Figure 5B:
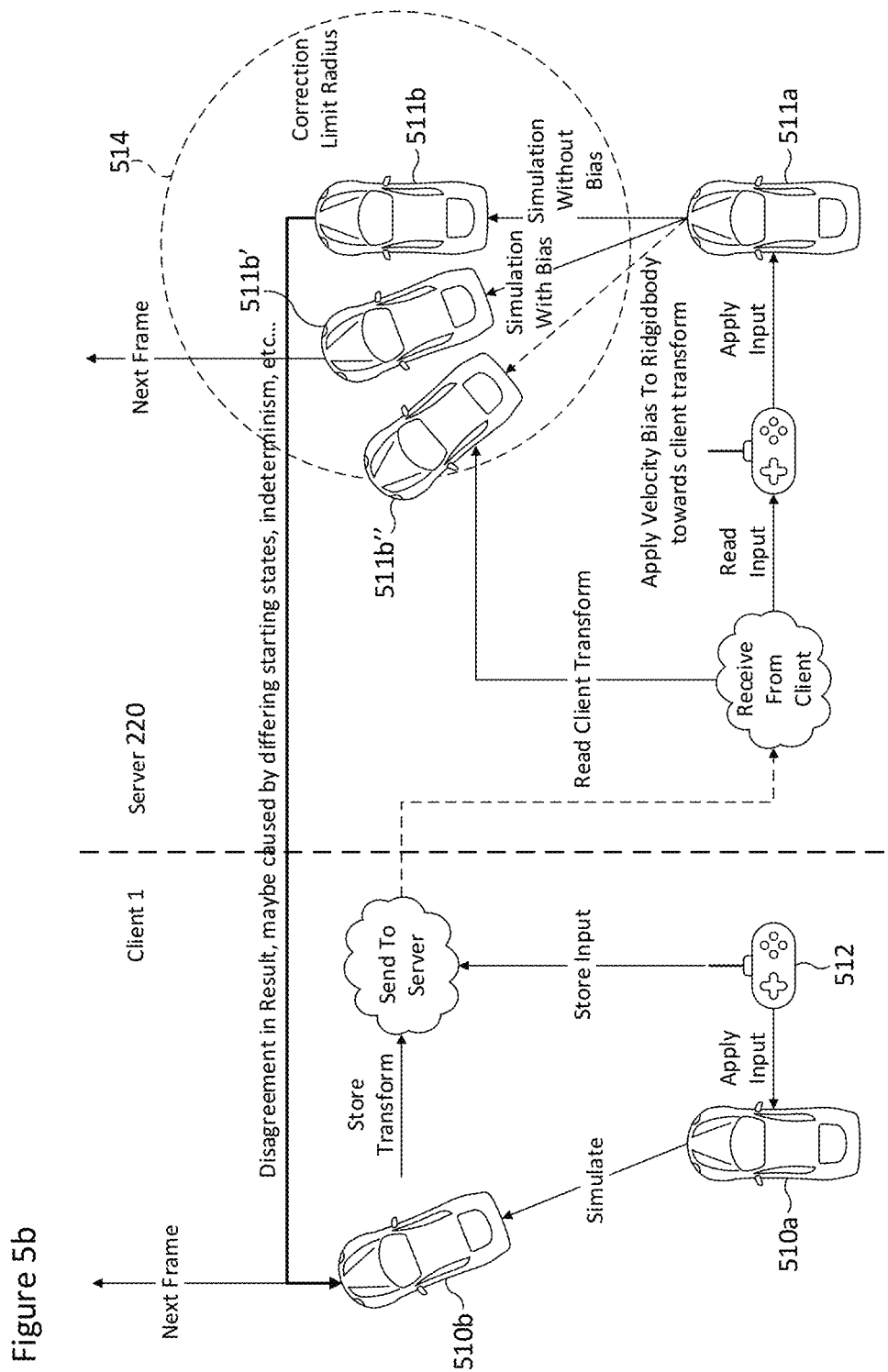
FIG. 5b schematically shows a scenario where the client and server simulation do not match but are within a sphere of influence.

Reference is made to FIG. 5b which shows a scenario where the server has to deal with a discrepancy between the position of the simulated entity that the server has been provided 511b" by the client device and the position of the simulated entity that the server has itself determined 511b. The discrepancy may be a result of different starting positions, indeterminism and/or a result of other mechanisms.

In the case of the example computer implemented game described previously, an area or volume of influence 514 around the position of the vehicle is provided on the server. For a game which is visualised in a 2D world, the area may be a circle or any other suitable shape. For a game which is visualised in a 3D world, the volume may be a sphere or any other suitable shape. If the transform hints that the server is receiving from the client are positioned inside this sphere, then the server will deem them acceptable for applying a bias to the vehicle to nudge the result of its simulation closer to the result the client predicted.

The transform hint 511b" provided by the client device is in the area of influence 514 of the transform 511b determined by the server. Thus, in the example shown in FIG. 5b, the bias provides the simulated entity 511b' which is between the simulated entities 511b of the server and 511b" of the client.

In some embodiments, the bias the server applies is in the form of a velocity blend of the vehicle's rigid body. The server does not just move the vehicle to the position the client wants as this can create issues with collisions between other vehicles as two clients could report that they are inside each other which is undesirable. Rather, the server "nudges" or moves the game entity to a position intermediate the simulation provided by the server without any bias and the simulation provided by the client. The blending provided by embodiments is a blending of two different states—that is the state simulated by the client and the state simulated by the server. The two states are for a same time or tick.

The server needs to be authoritative over the multiplayer game. Velocity blending allows control how much leeway the server gives to the clients.

In some embodiments the size of the sphere of influence can be controlled. Alternatively or additionally the strength of the biases applied to the vehicle can be controlled.

This server has checks to determine if the client is giving valid transform hints. In most cases when the vehicle is just driving around without interacting with remote objects, the server will expect vehicle simulation transforms to be very similar on both sides. The server may only expect desynchronisation when there are collisions with remote entities or if input packets are lost. The server may use client confidence scoring. This can be used to identify clients which are considered to be cheating or attempting to cheat the game. The server may only accept the transform hints from a client device after the client has provided a full set of inputs to the server.

It is possible for very large discrepancies between the client simulated entity 520c and server simulated entity 520b to occur. This may be a result of poor network conditions. In this regard reference is made to FIG. 5c. In these situations in order to stay synchronised with the server, the client moves its local vehicle back to the last known server position 520a if it ends up outside the sphere of influence 514. When this movement occurs, this creates a temporal anomaly. For example, the client device is predicting tick 8 and the client devices receives a snapshot for tick 3 from the server. If the client device predicted state at tick 3 was outside the sphere of influence, the vehicle back to the last known validated state (that is server state) of tick 3. However, the client device is at tick 8, so the client is now reporting state that happened 5 ticks ago. The server over multiple ticks will correct this issue (using velocity blending) and the client and server will eventually resynchronise.

The sphere of influence size is associated with a maximum latency. In some embodiments, the sphere of influence size may be calibrated to support a maximum latency of around 300 ms. Of course, in other embodiments, a different latency may be supported.

Reference is made to FIG. 6 which shows a method of some embodiments. The method may be performed in the user device.

In step S1, the user device receives user input via the user interface to control the game entity. This is associated with a particular time or tick.

In step S2, the user device applies the input to the game entity and then runs the simulation to provide a simulated entity. This is stored as a transform.

In step S3, the user device sends data to the server which indicates the user input and the transform determined by the user device.

This method is repeated by the user device. The method may be repeated by the user device each tick.

Reference is made to FIG. 7 which shows a method of some embodiments. The method may be performed in the user device.

In step T1, the user device receives data from the server about a transform at tick x. This may be in the form of snapshot data. This will be where the transform of the server and the transform of the user device do not match. It should be appreciated that for the user device, x is in the past and this will trigger a roll back such as shown in FIG. 4.

In step T2, for the next tick x+1 (which is also in the past), the user device applies the input for tick x+1 to the game entity and then runs the simulation to provide a simulated entity. This is stored as a transform for tick x+1. This transform for tick x+1 will replace the transform for tick x+1 which was generated previously at the time that the input was received. Transform data for tick x+1 is stored.

In step T3, the user device sends data to the server which indicates the user input for tick x+1 and the new transform for tick x+1 determined by the user device.

The method of steps T2 and T3 is repeated by the user device for the ticks between the current tick and tick x+1.

Figure 8:
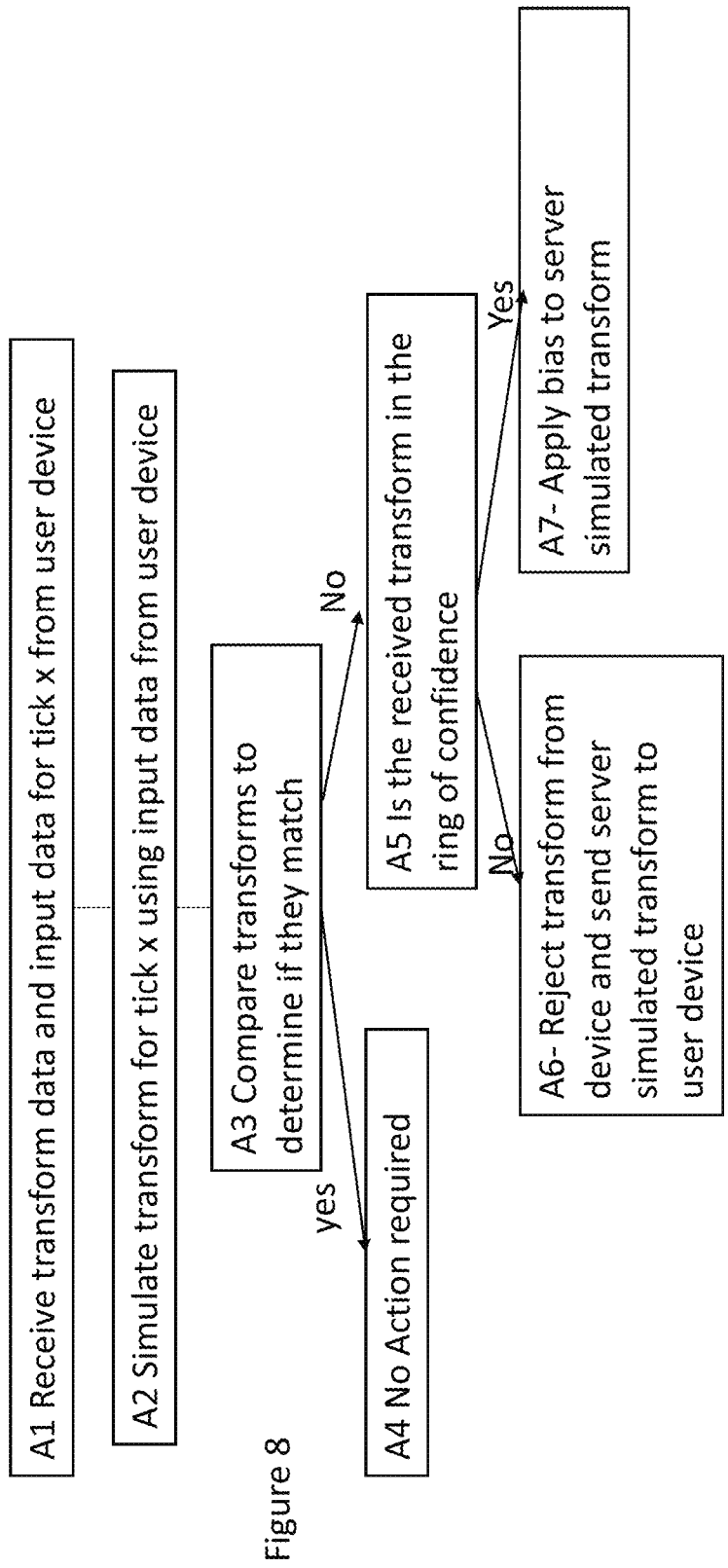
FIG. 8 shows a third method performed at a server of some embodiments.

Reference is made to FIG. 8 which shows a method of some embodiments. The method may be performed in the server.

In step A1, the server receives transform data and user input data from the user device for tick x.

In step A2, the server applies the received input to the game entity and then runs the simulation to provide a simulated entity. This is stored as a transform for tick x.

In step A3, the server compares the data which it has received from the server for tick x with the data for the transform for tick x which the server has determined.

If there is a match between the transforms, such as shown in FIG. 5a, then no action is required as shown in step A4.

If there is no match between the transforms, then in step A5, it is determined if the received transform data indicates if the game entity is within the ring of confidence.

Figure 5C:
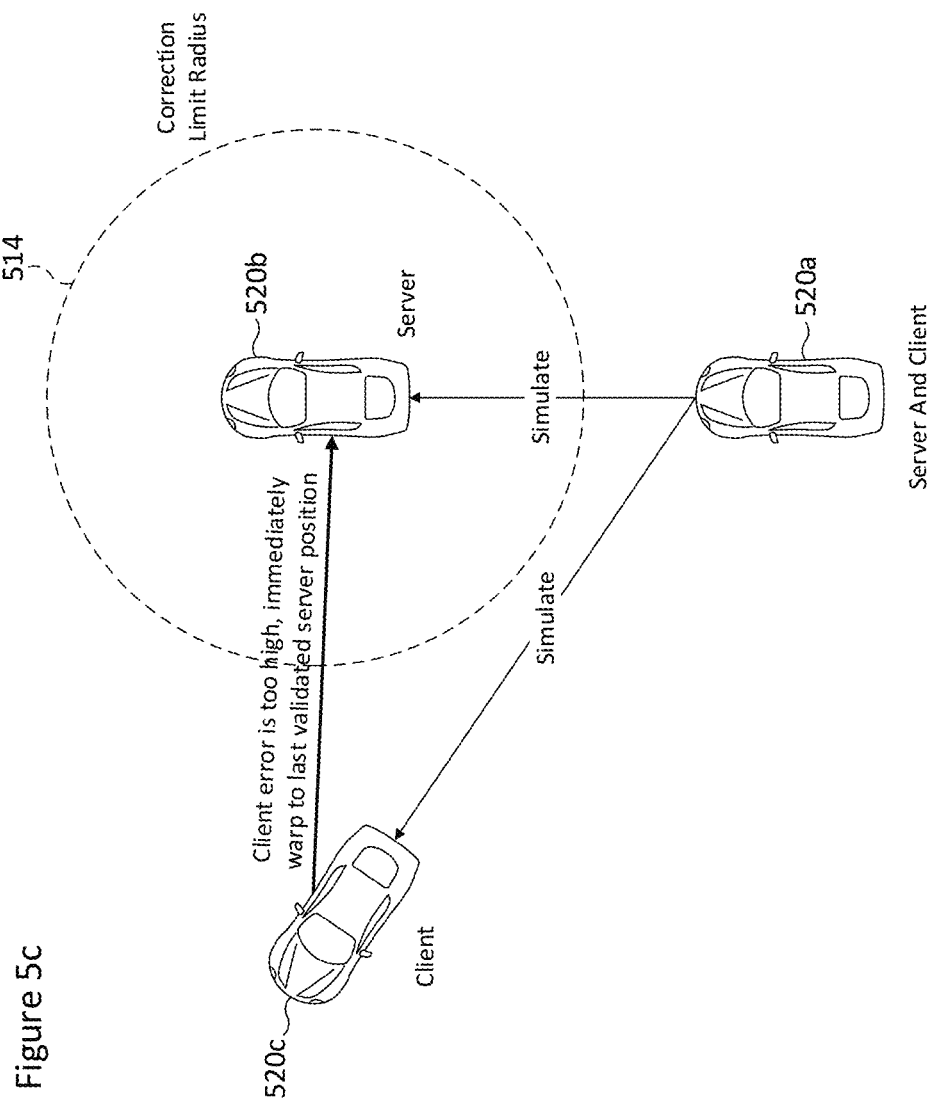
FIG. 5c schematically shows a scenario where the client and server simulation do not match and are outside a sphere of influence.

If it is determined that the received transform data indicates that the game entity is not within the ring of confidence (for example as shown in FIG. 5c), then the transform of the user device is rejected. The server will then send its transform data for the game entity to the user device. (The user device will then perform the method of FIG. 7.)

If it is determined that the received transform data indicates that the game entity is within the ring of confidence (for example as shown in FIG. 5b), then the transform of the user device is used in step A7 to determine a bias. The server will then apply the bias to the server side game entity to modify its transform for that tick. That transform will then be used for the determining the simulation for the next tick. In one embodiment, information about the biased simulation is not sent to the user device.

The method is repeated when the next transform data is received from the user device.

In one modification, the server sends the biased transform back to the client and then method of FIG. 7 is performed.

Some embodiments support the prediction of the spawning of a physics based entity locally on the client. One example is the predicting of the spawning of a projectile entity. For example, the client is currently on tick 3 and the current round-trip time means that the client is running two ticks ahead of the server to make sure inputs are making it on time. This means the server is currently processing tick 1. On tick 3 the client player decides to fire a projectile, so in order for there to be no delay for the player, the client device predicts that the projectile appears immediately. At the same time of all of this happening, the client sends the user input and transform for tick 3 to the server.

When the client is on tick 5, the server has just received the client device input for tick 3 and the server executes tick 3 with the input. In this example, the prediction on the client was correct and the server has also decided to spawn the projectile on the same tick.

However, the when the client was sending their input for tick 3, the server was sending a snapshot for tick 1. This is received at tick 5 and requires a rollback, such as previously described. This means the client device is rolling back to a tick where the projectile just created in the physics simulation does not exist. To deal with this, the snapshot buffer will store the predictively spawned entities after every tick. When there is a rollback to a tick where the predictively spawned entity should not exist game wise, the collision or other interaction is disabled but the entity is still allowed to be part of the physics step. In this way, the client device does not have to destroy the entity and then recreate it. As collision is disabled, the projectile will not interfere with the physics objects that should exist in this tick. During the client device re-simulation back up towards the present, the state of the entity on the tick it was spawned is re-applied (which in this case was tick 3).

During roll back, a predictively spawned entity may be provided but not its action. For example, consider the case of a projectile. If the player pressed the fire button, the client device will immediately predict the spawning of a projectile. However, it is possible that the client mis-predicted this spawning (there are several reasons as to why this may happen—for example, packet-loss). This means that the client has predicted the existence of the projectile, but the server will never spawn the projectile. Eventually the projectile on the client side will timeout and disappear from the game without ever affecting the state of the simulation.

Another case is where the server does spawn the projectile but has decided on a different trajectory for the projectile as compared to the determined trajectory by the client. For example, in this case the projectile on the client could hit a wall but, on the server, it continues flying through the level. If this occurred, the client would see the projectile explode and then later reappear into existence once it receives an indication from the server that the projectile is still alive.

Figure 9:
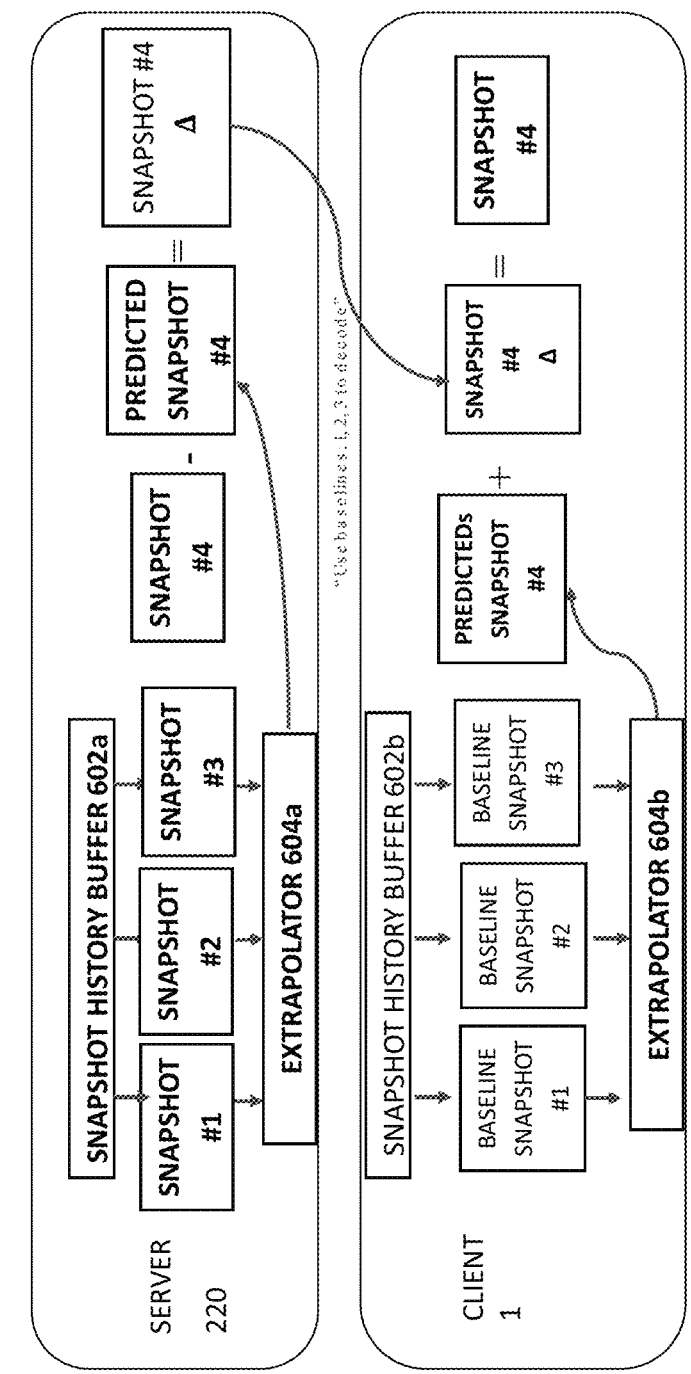
FIG. 9 schematically shows the server and the client interactions to generate a next data snapshot.

Reference is made to FIG. 9 which schematically shows the server 220 and the client 1. The server has a snapshot history buffer 602a which stores snapshot data for previous snapshots. The server has an extrapolator 604a. The extrapolator uses the data for one or more previous snapshots to determine data for a predicted snapshot. The predicted snapshot data is compared to the actual snapshot data to determine a difference between the actual snapshot data and the predicted snapshot data. This difference data is referred to as the delta or difference data. In some embodiments, the delta data is determined by a subtraction operation. In the example shown in FIG. 9, the predicted snapshot data is subtracted from the actual snapshot data. In other embodiments, the actual snapshot data may be subtracted from the predicted snapshot data.

The delta data is transmitted from the server to the client along with information identifying the snapshots which are to be used. The client also has a snapshot history buffer 602b which stores snapshot data for previous snapshots. The client also has an extrapolator 604b. The extrapolator uses the data for the previous snapshots, as indicated by the server, to determine data for a predicted snapshot. The extrapolator in the client device performs the same operation as the extrapolator in the server. The delta data which is received from the server is applied to the predicted snapshot data. In the case where the delta data is determined in the server by subtracting the predicted snapshot data from the actual snapshot data, the delta data is added to the predicted snapshot data determined in the client using the identified baseline snapshot data to determine the snapshot data to be used in the client. In the case where the delta data is determined in the server by subtracting the actual snapshot data from the predicted snapshot data, the delta data is subtracted from the predicted snapshot data determined in the client to determine the snapshot data to be used in the client.

Figure 14:
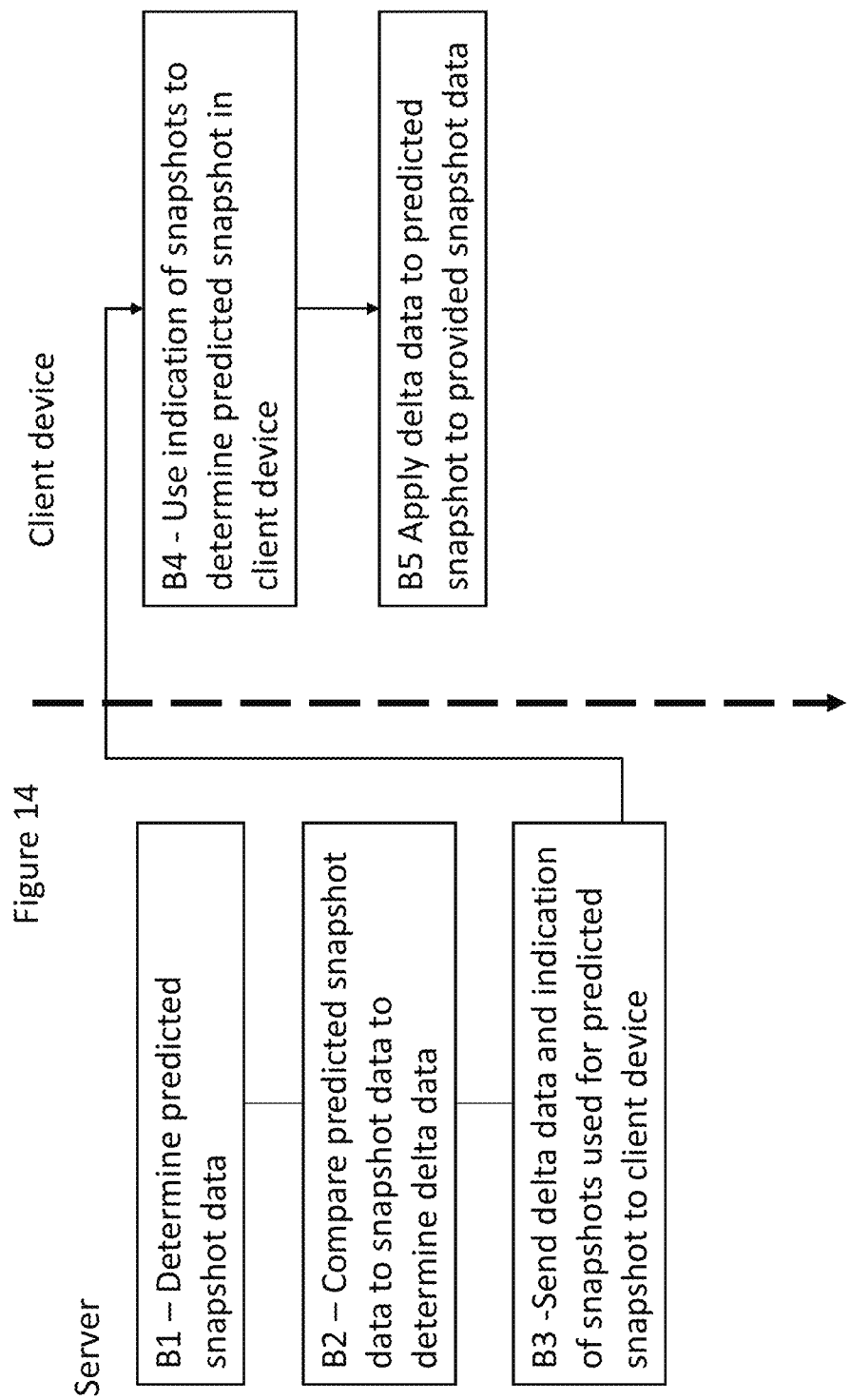
FIG. 14 shows a fourth method performed at a server and at a user device of some embodiments.

Reference is made to FIG. 14 which shows a method of some embodiments. The steps on the left hand side are performed in the server and the steps on the right hand side are performed in the client device.

In step B1, the server is configured to determine the predicted snapshot. This will use one or more previous snapshots in order to make this determination.

In step B2, the server is configured to compare the predicted snapshot with a determined snapshot in order to determine the delta or difference data as previously described.

In step B3, the server is configured to send the delta data and the indication of snapshots used for determining the predicted snapshot to the client device.

In step B4, the client device is configured to use the indication of the snapshots to determine the predicted snapshot. Other words, the client device will used the same previous snapshots to determine the predicted snapshot as the server.

In step B5, the client device is configured to apply the delta data do the predicted snapshot in order to provide the same snapshot as in the server.

Some embodiments may use code generation to build all the snapshots for all entity types. It may also generate the code for the jobs that serialize, deserialize, compress and decompress the snapshots. As mentioned previously the code generation takes all the fields from all the components and builds a snapshot that holds all the fields, for example as integers The compression may use a compression model. This compressing may bit pack values into a single stream by using an algorithm such as the Huffman Encoding algorithm. For this algorithm, it is preferred that smaller values are fed to it. Smaller values mean less bits are needed to represent them. So, the smaller the integer values, the smaller the packet.

As mentioned previously, a delta between the previous snapshot and the current one can be determined and sent across the network. This method requires that the client and server continually keep each other up to date with what snapshots they have previously stored in their history buffers that they can use to delta against. By storing the snapshots as integers, the client can deterministically reapply the delta data received from the server to rebuild the exact same snapshot the server has.

The prediction previously discussed may be determined by extrapolating the integers in the baseline snapshots being used. As the client has the same baseline snapshots, it can apply the same deterministic extrapolation to the baselines to get the exact same predicted snapshot for the given tick on the client as on the server.

It should be appreciated that data about all items in a game area may not be available in all snapshots. For example if a game entity is relatively far from the current player's entity, that game entity may not be included in each snapshot. This will be described in more detail later. Where a prediction is being made for that game entity, the preceding x snapshots which contain that game entity may be used to determine the predicted snapshot data. For example, the entity may be in snaps shots 1, 3 and 5. Those three snapshots may be used by the extrapolator. In some embodiments, snapshots which are older than a given threshold may be disregarded. In some embodiments, fewer than the usual number of snapshots may be used where the game entity is not in consecutive snapshots.

Figure 10:
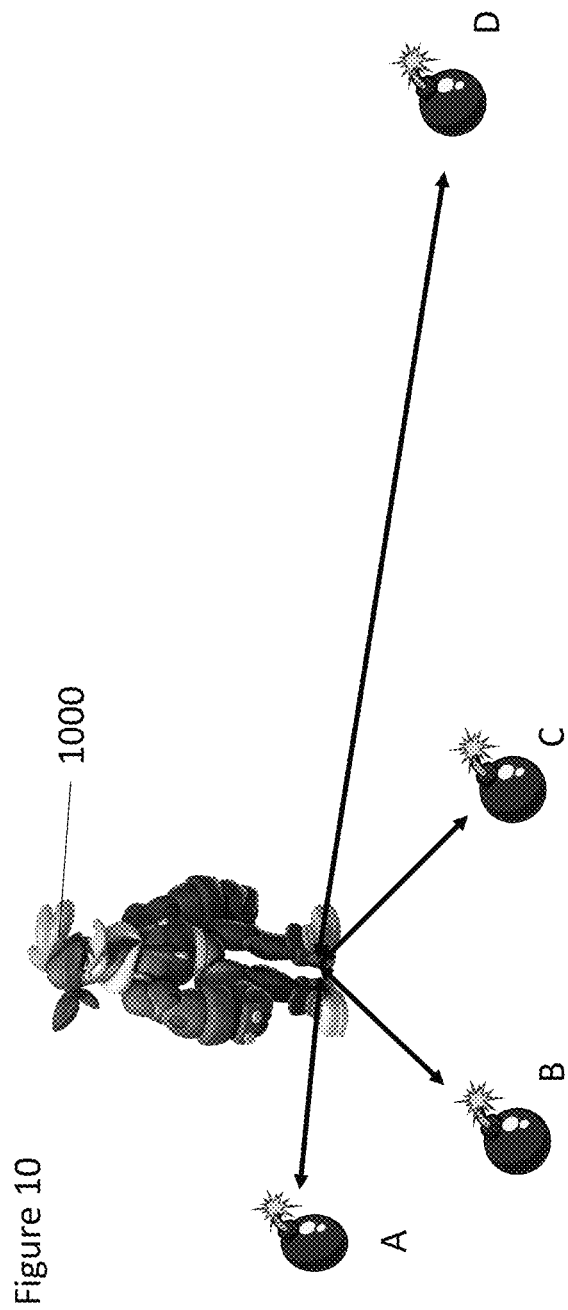
FIG. 10 schematically illustrates the determination as to whether information about a game entity is included in a particular snapshot.

In some embodiments, an importance may be associated with an entity which will define whether or not data about that that entity is included in a snapshot. Reference is made to FIG. 10 which shows a game entity 1000 of the player in the form of a character and four further game entities A to D in the form of bombs. As can be seen, bombs A to C are located near the game entity 1000. Bombs A to C would be given a high importance and may be included in every snapshot. However, bomb D which is located far from game entity 1000 would be given a low importance and may not be included in every snapshot.

In some embodiments, there may be a limit in the number of entities for which data can be included. In some embodiments, the entities which are giving a score or value which is used to determine which entities get to go in the next snapshot. Accordingly, in some embodiments, the server will keep track in which snapshots an entity is provided. The server may thus provide the user device with information as to the snapshots which are to be interpolated, as discussed in relation to FIG. 9.

The entity prioritization used in some embodiments will now be described. In some embodiments, there are a relatively large number of entities for which information needs to be provided by the server to the user devices. Some embodiments aim to keep the server packet sizes under the MTU (maximum transmission unit) size to avoid fragmentation. This MTU size may be of the order of around 1400 bytes in some embodiments. In some embodiments, the process can relatively be intensive with respect to the server processors particularly, where a relatively large number of players are playing the game. For example, some embodiments may have up to 10 players playing the same instance of the game. Other embodiments may support more or less than 10 players playing the same instance of the game.

Data for a game entity with a higher priority has a higher chance of being included in a given set of snapshot data. The priority may be determined based on one or more parameters. For example, the priority may be determined taking into account an urgency value. The urgency value may depend on how long ago data was previously sent relating to the particular entity and/or what the game entity is doing (e.g. a bomb which is blowing up will be given a high urgency value). The priority may be determined alternatively or additionally based on a relevance parameter. The relevance parameter may be based on a determination of a distance from the entity of the player, such as shown in FIG. 10. Alternatively or additionally, the relevance parameter may take into account an action being performed by the entity and/or the type of entity.

In some embodiments, each entity may be provided with a pair of values—one indicating urgency and one indicating relevance.

In some embodiments, each value is in the range of 0 to 1. However in other embodiments, different value ranges may be used.

In other embodiments, there may be a single value or more than two values. Where there is a single value, this may take into account both the urgency and the relevance parameters. In some embodiments, there may be more than two values. For example, a class value may be provided which classifies the game entities into different types.

It should be appreciated that in some embodiments, a snapshot size may be limited. By way of example only the maximum snapshot size maybe of the order of the 600 bytes. However, it should be appreciated that in other employments, the maximum snapshot size may be more or less than 600 bytes.

Some embodiments may make use of quad trees. In this regard reference is made to FIG. 11. FIG. 11 schematically shows the representation of an image 1102 displayed on the display of the various entities in the game. In example, the entities are referenced A to E. A quadtree is a tree data structure in which each internal node has exactly four children. Quadtrees used to partition a two-dimensional space by recursively subdividing it into four quadrants or regions. They decompose space into adaptable cells. Each cell has a maximum capacity. When maximum capacity is reached, the cell splits into 4. In the example of FIG. 11, the display area is divided into four cells 1104, 1106, 1108 and 1110. Cell 1106 has no entities in it and is not subdivided. Cell 1102 is divided into four cells 1112 as it has 2 entities. However both of these 2 entities are in the same cell so that cell is in turn divided into four cells 1114. The two entities are now in separate cells and no further subdivision is required.

Likewise cell 1108 is divided into four cells 1116 as it has 2 entities. The two entities are now in separate cells and no further subdivision is required. In the example shown in FIG. 11, cell 1104 has one entity and is divided into for cells in order to give some granularity in the position of the entity in that cell.

The tree structure shown in FIG. 11 follows the spatial decomposition of the quadtree. Each node of the tree represents a cell and each layer corresponds to the resolution of the image. The first layer 1118 represents the entire image and is represented by a single node 1120. The next layer 1122 represents the four cells of the entire image with each cell being represented by a node 1124. The next layer 1126 represents cells of the previous layer divided into four cells (where required) with each cell being represented by a node 1128. The next layer 1130 is where a cell is of the previous layer need to be divided into four cells with each cell being represented by a node 1132. The nodes which are shown in shaded in FIG. 11 represent the cell in which the entity is located.

Figure 12:
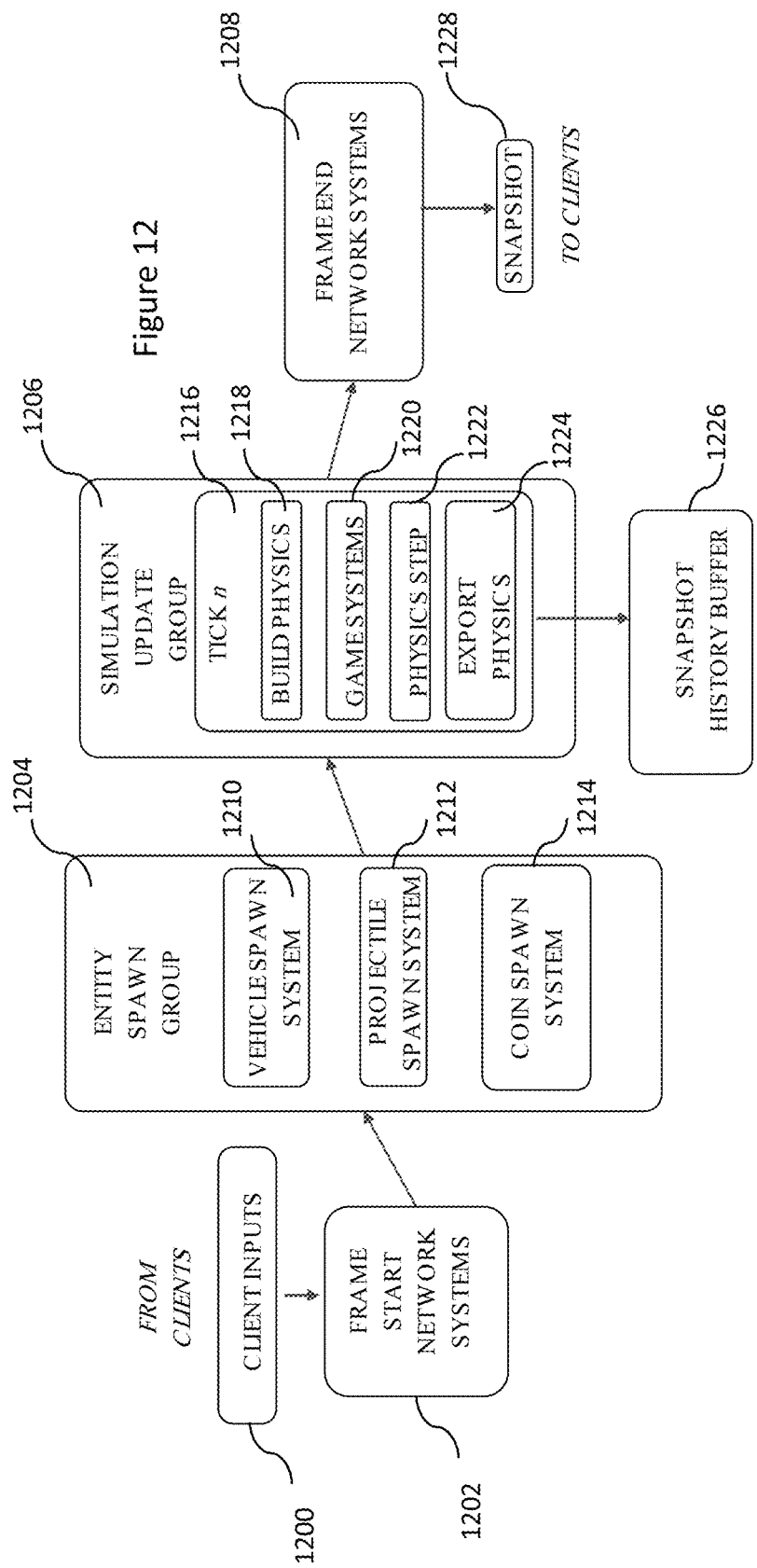
FIG. 12 schematically shows a server of some embodiments.
Figure 13:
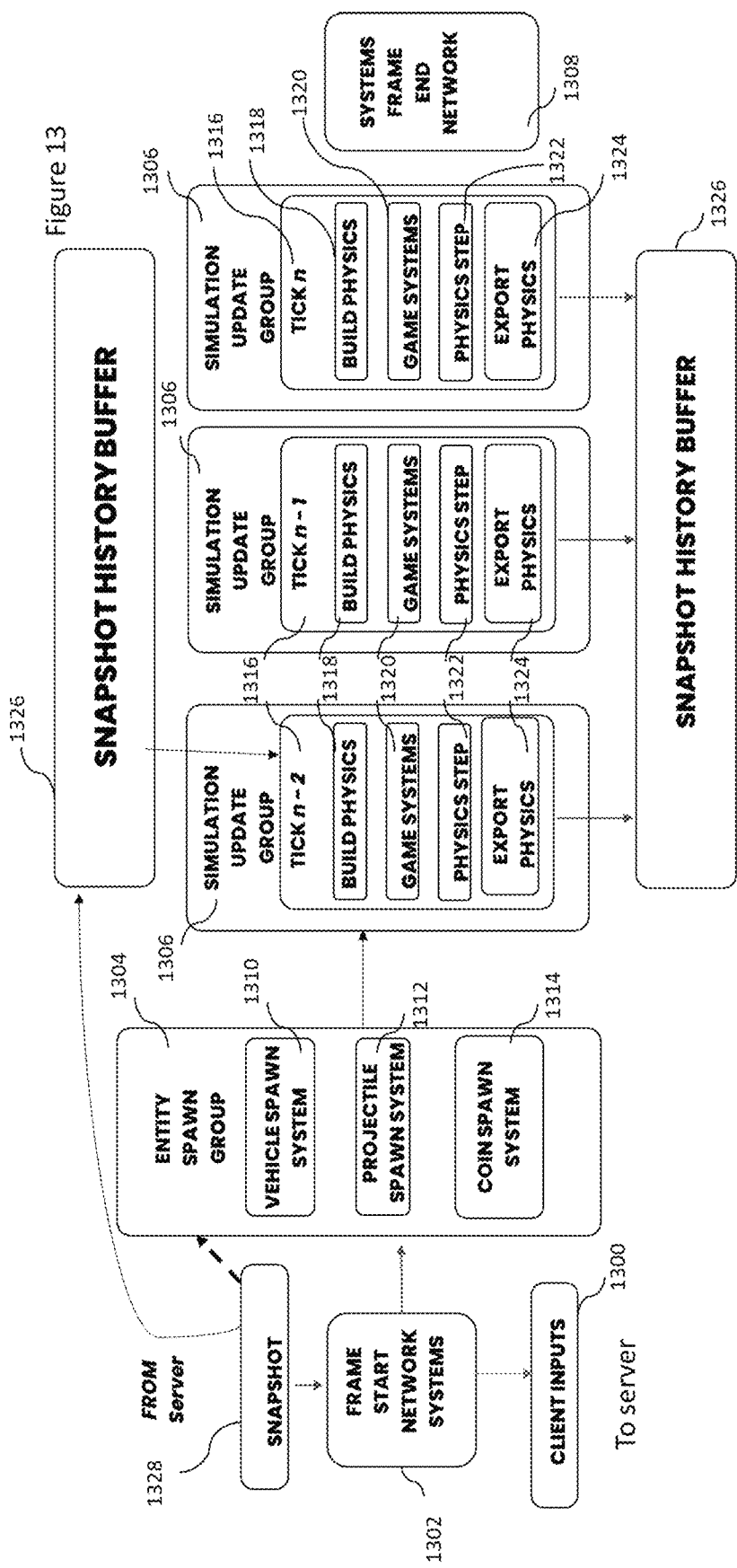
FIG. 13 schematically shows a user device of some embodiments.

Reference is made to FIGS. 12 and 13 which respectively show a server and user device on which some embodiments may be provided.

Some embodiments may use an entity component system ECS for the computer implemented game. A computer implemented game which is written with the ECS pattern uses systems to run game logic which results in the state of components being modified. In one example game, there may be two groups of systems, the entity spawn group and the simulation update group.

One or more of the components shown in FIG. 12 may be implemented by at least one processor and at least one memory of the server which is configured to provide the computer implemented device.

The server of FIG. 12 has an entity spawn group 1204 and a simulation update group 1206.

The entity spawn group executes first and contains systems that decide when different entity types should spawn. These systems may mostly contain server authoritative code (which means clients are not allowed to execute it). However, these systems may include some client code that are responsible for spawning entities when the server tells them to.

The entity spawn group 1204 may for example include a vehicle spawn system 1210, a projectile spawn system 1212 and a coin spawn system 1214. The spawn systems which are provided will depend on the particular game being implemented and other games may have different spawn systems for the entities of that game.

The simulation update group 1206 contains systems that execute to update the state of a single tick. The code in these systems may contain a mixture of server authoritative code and client prediction code.

A single tick involves building the physics 1218. This is where ECS physics components are converted into internal physics data used by the physics package used by the game. The game specific systems 1220 run the physics step 1222 and finally export 1224 the physics world back into ECS data so that the state can be carried into the next tick. A snapshot output is saved to the snapshot history buffer 1226. An output is provided by the simulation update group to the frame end network systems 1208. This output is the snapshot data 1228 as previously discussed The user inputs 1200 provided via the user interface received from the user device and are provided to frame start network systems 1202, the output of which is provided to the entity spawn group.

Reference is made to FIG. 13 which shows the user device. It should be appreciated that the structure of the systems used in the user device and the server are the same. One or more of the components shown in FIG. 13 may be implemented by at least one processor and at least one memory.

Accordingly, the user device has an entity spawn group 1304 and a simulation update group 1306.

The entity spawn group 1304 may for example include a vehicle spawn system 1310, a projectile spawn system 1312 and a coin spawn system 1314 in line with the example spawn systems on the server.

The simulation update group 1306 will build the physics 1218. This is where ECS physics components are converted into internal physics data used by the physics package used by the game. The game specific systems 1320 run the physics step 1322 and finally export 1324 the physics world back into ECS data so that the state can be carried into the next tick. A snapshot output is saved to the snapshot history buffer 1326. An output is provided by the simulation update group to the frame end network systems 1308.

The snapshots 1328 provided by the server are provided to frame start network systems 1302, the output of which is provided to the entity spawn group. Information about the user input is provided to the server, as previously described.

As previously described, at the start of the server update it will receive inputs from the clients. After the server has processed its simulation tick, it saves a snapshot of that tick into a snapshot history buffer. The snapshot history buffer may be a circular buffer that holds snapshots of ticks it has previously simulated. At the end of the update, the server sends the latest recorded snapshot over to the clients.

On the user device, the scenario where the client receives a snapshot from the server and needs to do a rollback is shown. At the start of the update the client receives a server snapshot and also sends out its own input for this tick. The first thing the client does when it receives a snapshot is save the snapshot into its history buffer. The entity spawn group receives entity spawn requests from this snapshot. For example, if the snapshot contains information for entities that do not yet exist on the client, then a spawn system is chosen to be given the spawn request based on the type of entity it is responsible for spawning. As illustratively shown in FIG. 13, in a single update, three ticks are being processed. This is because in this example the received snapshot is 2 ticks old and there is a need to rollback 2 ticks and then re-simulate 2 ticks forward to the present. This is schematically shown by a simulation update group 1306a for tick n−2, a simulation update group 1306b for tick n−1 and a simulation update group 1306c for tick n.

The rollback is done by reading from the history buffer into the first tick (n−2) which is now representing the tick of the received snapshot. The simulating is continued until the present is reached again.

In some embodiments, one or more of the physics systems may be effectively avoided or simplified. For example, in tick n−2 and tick n−1, the exporting of physics may be avoided. For tick n−2 and tick n, the building of the physics may be avoided. This is because building and exporting the physics world takes time, so for the sake of performance, the amount of time needed to do this may be reduced by allowing the internal state of the physics to pass through one tick into the next.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided, and embodied by means of an appropriate carrier medium. An appropriate computer program can be embodied on a computer readable record medium. A possibility is to download the program code product via a data network. In general, the various embodiments may be implemented in hardware or special purpose circuits, software, logic, or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer implemented server configured to provide a computer implemented game, the computer implemented server comprising at least one processor which is configured to:
   receive from a user device data defining a user input at a first given time and data about a position of a first simulation for a first game entity, the position of the first simulation determined on the user device using the user input at the first given time;
   use the received data defining the user input at the first given time to determine a position of a second simulation for the first game entity, the position of the second simulation determined using data stored in the server;
   responsive to a difference in the positions of the first and second simulations, determine a bias;
   update the position of the second simulation using the determined bias for providing an updated position for the simulation for the first given time; and
   provide data to the user device, defining the updated position for the simulation for the first given time.

2. The computer implemented server as claimed in claim 1, wherein the at least one processor is configured to determine that there is less than a threshold difference between the position of the first and second simulations, and when there is less that a threshold difference, determining the bias.

3. The computer implemented server as claimed in claim 2, wherein the at least one processor is configured to determine that there is less than the threshold difference between the position of the first and second simulations by determining that the position of the first simulation lies within a threshold area of the position of the second simulation.

4. The computer implemented server as claimed in claim 3, wherein the threshold area comprises a circle.

5. The computer implemented server as claimed in claim 1, wherein the bias comprises a blend of information relating to the position of the first simulation and position of the second simulation.

6. The computer implemented server as claimed in claim 1, wherein the at least one processor is configured to use data relating to the updated position of the simulation when determining a position of a third simulation for a next time interval using data received from the user device defining a user input of the next time interval.

7. The computer implemented server as claimed in claim 1, wherein the at least one processor is configured to:
   receive from the user device data defining a user input at a second given time and data about a position of a fourth simulation for the first game entity, the fourth simulation determined on the user device using the user input at the second given time;
   use the received data defining the user input at the second given time to determine a position of a fifth simulation for the first game entity, using data stored in the server; and
   responsive to a difference in the positions of the fourth and fifth simulations being larger than a threshold difference, cause information associated with fifth simulation to be sent to the user device for providing an updated simulation for the second given time.

8. The computer implemented server as claimed in claim 1, wherein the at least one processor is configured to:
   receive from the user device data defining a user input at a third given time and data about a position of a sixth simulation for the first game entity, the sixth simulation determined on the user device using the user input at the third given time;
   use the received data defining the user input at the third given time to determine a position of a seventh simulation for the first game entity, using data stored in the server; and
   responsive to there being no difference in the sixth and seventh simulations determining that the position of the sixth simulation is correct.

9. The computer implemented server as claimed in claim 1, wherein the computer implemented game is a multiplayer computer implemented game where one instance of the computer implemented game is played by a plurality of different players on respective user devices.

10. The computer implemented server as claimed in claim 1, wherein the user device is a mobile device.

11. A system comprising a computer implemented server and a user device configured to provide a computer implemented game,
   the user device comprising at least one processor which is configured to:
   transmit to the server data defining a user input at the first given time and data about a position of a first simulation for a first game entity, the position of the first simulation determined using the user input at the first given time, and
   the computer implemented server comprising at least one processor which is configured to:
   receive from the user device the data defining the user input at a first given time and data about the position of the first simulation for a first game entity;
   use the received data defining the user input at the first given time to determine a position of a second simulation for the first game entity, the position of the second simulation determined using data stored in the server;
   responsive to a difference in the positions of the first and second simulations, determining a bias;
   updating the position of the second simulation using the determined bias for providing an updated position for the simulation for the first given time; and
   provide data to the user device, defining the updated position for the simulation for the first given time.

12. A computer implemented method performed by a server configured to provide a computer implemented game, the method comprising:
   receiving from a user device data defining a user input at a first given time and data about a position of a first simulation for a first game entity, the position of the first simulation determined on the user device using the user input at the first given time;
   using the received data defining the user input at the first given time to determine a position of a second simulation for the first game entity, the position of the second simulation determined using data stored in the server;
   responsive to a difference in the positions of the first and second simulations, determining a bias;
   updating the position of the second simulation using the determined bias for providing an updated position of the simulation for the first given time; and providing data to the user device, defining the updated position for the simulation for the first given time.

13. The computer implemented method as claimed in claim 12, comprising determining that there is less than a threshold difference between the position of the first and second simulations, and when there is less that a threshold difference, determining the bias.

14. The computer implemented method as claimed in claim 13, comprising determining that there is less than the threshold difference between the position of the first and second simulations by determining that the position of the first simulation lies within a threshold area of the position of the second simulation.

15. The computer implemented method as claimed in claim 14, wherein the threshold area comprises a circle.

16. The computer implemented method as claimed in claim 12, wherein the bias comprises a blend of information relating to the position of the first simulation and the position of the second simulation.

17. The computer implemented method as claimed in claim 12, comprising using data relating to the updated position of the simulation when determining a position of a third simulation for a next time interval using data received from the user device defining a user input of the next time interval.

18. The computer implemented method as claimed in claim 12, comprising:
receiving from the user device data defining a user input at a second given time and data about a position of a fourth simulation for the first game entity, the position of the fourth simulation determined on the user device using the user input at the second given time;
using the received data defining the user input at the second given time to determine a position of a fifth simulation for the first game entity, using data stored in the server; and
responsive to a difference in the position of the fourth and fifth simulations being larger than a threshold difference, causing information associated with the position of the fifth simulation to be sent to the user device for providing an updated simulation for the second given time.

19. The computer implemented method as claimed in claim 12, comprising:
receiving from the user device data defining a user input at a third given time and data about a position of a sixth simulation for the first game entity, the position of the sixth simulation determined on the user device using the user input at the third given time;
using the received data defining the user input at the third given time to determine a position of a seventh simulation for the first game entity, using data stored in the server; and
responsive to there being no difference in the positions of the sixth and seventh simulations determining that the position of the sixth simulation is correct.

20. The computer implemented method as claimed in claim 12, wherein the computer implemented game is a multiplayer computer implemented game where one instance of the computer implemented game is played by a plurality of different players on respective user devices.

21. The computer implemented method as claimed in claim 12, wherein the user device is a mobile device.

22. A computer readable non-transitory storage medium carrying one or more computer executable instructions which when run on at least one processor cause:
receiving from a user device data defining a user input at a first given time and data about a position of a first simulation for a first game entity, the position of the first simulation determined on the user device using the user input at the first given time;
using the received data defining the user input at the first given time to determine a position of a second simulation for the first game entity, the position of the second simulation determined using data stored in the server;
responsive to a difference in the positions of the first and second simulations, determining a bias;
updating the position of the second simulation using the determined bias for providing an updated position of the simulation for the first given time;
providing data to the user device, defining the updated position for the simulation for the first given time.

* * * * *